United States Patent
Kadoya et al.

(10) Patent No.: US 12,472,379 B2
(45) Date of Patent: Nov. 18, 2025

(54) DOSE DISTRIBUTION CREATING PROGRAM IN CONSIDERATION OF INFLUENCE OF MAGNETIC FIELD, DOSE DISTRIBUTION CREATING METHOD IN CONSIDERATION OF INFLUENCE OF MAGNETIC FIELD, AND DOSE DISTRIBUTION CREATING APPARATUS

(71) Applicant: TOHOKU UNIVERSITY, Sendai (JP)

(72) Inventors: Noriyuki Kadoya, Sendai (JP); Tomohiro Kajikawa, Sendai (JP); Shohei Tanaka, Sendai (JP); Suguru Dobashi, Sendai (JP); Keiichi Jingu, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 251 days.

(21) Appl. No.: 18/034,203

(22) PCT Filed: Nov. 4, 2021

(86) PCT No.: PCT/JP2021/040559
§ 371 (c)(1),
(2) Date: Apr. 27, 2023

(87) PCT Pub. No.: WO2022/097676
PCT Pub. Date: May 12, 2022

(65) Prior Publication Data
US 2023/0390583 A1    Dec. 7, 2023

(30) Foreign Application Priority Data
Nov. 5, 2020   (JP) ................................. 2020-185160

(51) Int. Cl.
*A61N 5/10* (2006.01)
*G16H 20/40* (2018.01)
(Continued)

(52) U.S. Cl.
CPC ........... *A61N 5/1039* (2013.01); *G16H 20/40* (2018.01); *G16H 30/20* (2018.01); *G16H 50/20* (2018.01); *A61N 2005/1055* (2013.01)

(58) Field of Classification Search
CPC ........ A61N 5/10; A61N 5/103; A61N 5/1039; A61N 5/1031; A61N 2005/1055; G16H 20/40; G16H 30/20; G16H 50/20
See application file for complete search history.

(56) References Cited

U.S. PATENT DOCUMENTS

| 2012/0022363 A1 | 1/2012 | Dempsey |
| 2016/0310761 A1 | 10/2016 | Li et al. |
| 2020/0254277 A1 | 8/2020 | Eriksson et al. |

FOREIGN PATENT DOCUMENTS

| JP | 2019-526380 A | 9/2019 |
| JP | 2020-528791 A | 10/2020 |

(Continued)

OTHER PUBLICATIONS

Kajikawa et al., "Dose distribution correction for the influence of magnetic field using a deep convolutional neural network for online MR-guided adaptive radiotherapy", Physica Medica, Acta Medica Edizioni E Congressi, Rome, IT, vol. 80, Nov. 11, 2020 (Nov. 11, 2020), pp. 186-192, XP086410497, ISSN: 1120-1797, DOI: 10.1016/J.EJMP.2020.11.002 [retrieved on Nov. 11, 2020].

(Continued)

*Primary Examiner* — Jurie Yun
(74) *Attorney, Agent, or Firm* — Morgan, Lewis & Bockius LLP

(57) ABSTRACT

Dose distribution creating program and dose distribution creating method in consideration of influence of a magnetic field, and a dose distribution creating apparatus, enabling dose calculation in a magnetic field faster and more accurately in which a computer acquires a captured image of a subject captured with a magnetic field and an electrical wave (Continued)

or a photon beam, a dose distribution not in a magnetic field, and a dose distribution in a magnetic field, and inputs the dose distribution not in a magnetic field and information based on the captured image to a learning model including a plurality of layers and trained in advance using the dose distribution not in a magnetic field, the dose distribution in a magnetic field, and the information based on the captured image, and estimates the dose distribution in a magnetic field.

7 Claims, 13 Drawing Sheets

(51) Int. Cl.
  *G16H 30/20* (2018.01)
  *G16H 50/20* (2018.01)

(56) References Cited

FOREIGN PATENT DOCUMENTS

| | | |
|---|---|---|
| JP | 2020-178935 A | 11/2020 |
| WO | 2018/048575 A1 | 3/2018 |
| WO | 2019/023142 A1 | 1/2019 |

OTHER PUBLICATIONS

Extended European Search Report dated Jul. 10, 2024, issued in corresponding European Patent Application No. 21889229.7.
Kadoya, "Current Status of MR-Linac System", Jpn. J. Med. Phys., vol. 36, No. 4: 229-235 (2016) (with English summary on first page).
Huang et al., "Densely Connected Convolutional Networks", 2017 IEEE Conference on Computer Vision and Pattern Recognition (Cvpr), IEEE, 2017.
International Search Report (with partial translation) dated Jan. 11, 2022, issued in corresponding International Patent Application No. PCT/JP2021/040559.

DOSE DISTRIBUTION CREATING PROGRAM IN CONSIDERATION OF INFLUENCE OF MAGNETIC FIELD, DOSE DISTRIBUTION CREATING METHOD IN CONSIDERATION OF INFLUENCE OF MAGNETIC FIELD, AND DOSE DISTRIBUTION CREATING APPARATUS

TECHNICAL FIELD

The present invention relates to a dose distribution creating program in consideration of influence of a magnetic field, a dose distribution creating method in consideration of influence of a magnetic field, and a dose distribution creating apparatus.

The present application claims priority based on Japanese Patent Application No. 2020-185160 filed on Nov. 5, 2020, and contents thereof are incorporated herein.

BACKGROUND ART

As a new treatment apparatus for radiation therapy, an MR-Linac in which a magnetic resonance (MR) apparatus using a magnetic field and a radiation therapy device (Linac) are integrated has started to be widely used (for example, see NPL 1).

In radiation therapy using such an MR-Linac, for example, first, an image is captured by a magnetic resonance imaging (MRI) apparatus before treatment, and a treatment plan is created based on the captured MR image. Next, the MR image is acquired on the day of treatment by the MR-Linac apparatus. Next, using the MR image captured on the day of treatment, an irradiation position or the like in a scheduled treatment plan is calculated, and a doctor confirms whether the treatment plan needs to be corrected. Then, when a treatment may be performed according to the scheduled treatment plan, a radiation therapy is performed according to the treatment plan. When the treatment cannot be performed according to the scheduled treatment plan, a treatment is performed by creating a treatment plan in a state in which a subject (patient) is on a treatment table using the MR image captured on the day of the treatment.

As described in NPL 1, in such an apparatus in which the MR apparatus using a magnetic field and the radiation therapy device are integrated, radiation is affected by the magnetic field. For example, when secondary electrons emitted from a phantom are bent by the magnetic field and enter the phantom again, an electron return effect (ERE) phenomenon occurs in which a dose at a boundary surface portion between air and water increases. In addition, since the secondary electrons are bent by the magnetic field, a phenomenon occurs in which a dose distribution is biased, including in a high-dose region. Therefore, in the treatment using such an apparatus, it is necessary to calculate a behavior of a radiation beam inside the patient with the magnetic field constantly generated.

In addition, in creating a radiation therapy plan, a system for planning a radiation therapy treatment plan by using a machine learning approach and a neural network component has been proposed (for example, see PTL 1). In the technique described in PTL 1, a neural network is trained using one or more three-dimensional medical images, one or more three-dimensional anatomical maps, and one or more dose distributions to predict a fluence map or a dose map. In the technique described in PTL 1, during training, the neural network receives an expected dose distribution determined by the neural network to be compared with the predicted dose distribution. In the technique described in PTL 1, a comparison is repeatedly performed until a predetermined threshold value is achieved. In the technique described in PTL 1, a three-dimensional dose distribution is provided using the trained neural network.

CITATION LIST

Patent Literature

PTL 1: Japanese Translation of PCT International Application Publication No. JP-T-2019-526380

Non Patent Literature

NPL 1: Noriyuki Kadoya, "current status of MR-Linac fusion apparatus", <Special issue of the 110th Annual Meeting of the Japan Society of Medical Physics> Symposium 2 "fusion technique of diagnosis and treatment", Medical Physics, Vol. 36, No. 4, 2016, p229-235

SUMMARY OF INVENTION

Technical Problem

However, most treatment apparatuses in the related art do not support a magnetic field. Although there are treatment plan apparatuses supporting a magnetic field, it is necessary to calculate radiation one by one in order to reflect a bending force due to the magnetic field in a dose distribution. Therefore, in the related art, it is necessary to use a low-speed calculation algorithm for accurate dose calculation, and there is a problem that it takes a lot of time to calculate a dose and that a subject stays on a treatment table for a long time.

The present invention is made in view of the above problems, and an object of the present invention is to provide a dose distribution creating program in consideration of influence of a magnetic field, a dose distribution creating method in consideration of influence of a magnetic field, and a dose distribution creating apparatus, enabling dose calculation in a magnetic field faster and more accurately than in the related art.

Solution to Problem

In order to achieve the above-described object, a dose distribution creating program in consideration of influence of a magnetic field according to one aspect of the present invention causes a computer to: acquire a captured image of a subject captured with a magnetic field and an electrical wave or a photon beam, a dose distribution not in a magnetic field, and a dose distribution in a magnetic field; and input the dose distribution not in a magnetic field and information based on the captured image to a learning model including a plurality of layers and trained using the dose distribution not in a magnetic field, the dose distribution in a magnetic field, and the information based on the captured image, and estimate the dose distribution in a magnetic field.

In addition, in the dose distribution creating program in consideration of influence of a magnetic field according to one aspect of the present invention, the information based on the captured image may be one of a CT image of the subject, an MR image of the subject, an electron density map generated based on the CT image of the subject, and an electron density map generated based on the MR image of the subject.

In addition, in the dose distribution creating program in consideration of influence of a magnetic field according to one aspect of the present invention, the dose distribution may include a distribution image parallel to an irradiation direction of radiation or a plurality of tomographic images perpendicular to the irradiation direction, the dose distribution not in a magnetic field provided for pre-training and input may be the distribution image or the plurality of tomographic images which are normalized, and the dose distribution in a magnetic field may be a plurality of tomographic images obtained by correcting each pixel value with a coefficient representing influence of a magnetic field after being normalized.

In addition, in the dose distribution creating program in consideration of influence of a magnetic field according to one aspect of the present invention, the learning model may be a convolutional neural network including a dense block, and the computer may input the information based on the image of the subject captured with the magnetic field and the electrical wave or the photon beam to any layer after the dense block of the learning model including the plurality of layers.

In addition, in the dose distribution creating program in consideration of influence of a magnetic field according to one aspect of the present invention, the learning model may be a convolutional neural network including skip connection.

In order to achieve the above object, a dose distribution creating method in consideration of influence of a magnetic field according to one aspect of the present invention causes a computer to: acquire a captured image of a subject captured with a magnetic field and an electrical wave or a photon beam, a dose distribution not in a magnetic field, and a dose distribution in a magnetic field; and input the dose distribution not in a magnetic field and information based on the captured image to a learning model including a plurality of layers and trained using the dose distribution not in a magnetic field, the dose distribution in a magnetic field, and the information based on the captured image, and estimate the dose distribution in a magnetic field.

In order to achieve the above object, a dose distribution creating apparatus according to one aspect of the present invention includes: an acquisition unit configured to acquire a captured image of a subject captured with a magnetic field and an electrical wave or a photon beam, a dose distribution not in a magnetic field, and a dose distribution in a magnetic field; and a magnetic field correction unit configured to input the dose distribution not in a magnetic field and information based on the captured image to a learning model including a plurality of layers and trained using the dose distribution not in a magnetic field, the dose distribution in a magnetic field, and the information based on the captured image and estimate the dose distribution in a magnetic field.

Advantageous Effects of Invention

According to the present invention, dose calculation in a magnetic field can be performed faster and more accurately than in the related art.

DESCRIPTION OF EMBODIMENTS

Figure 1:
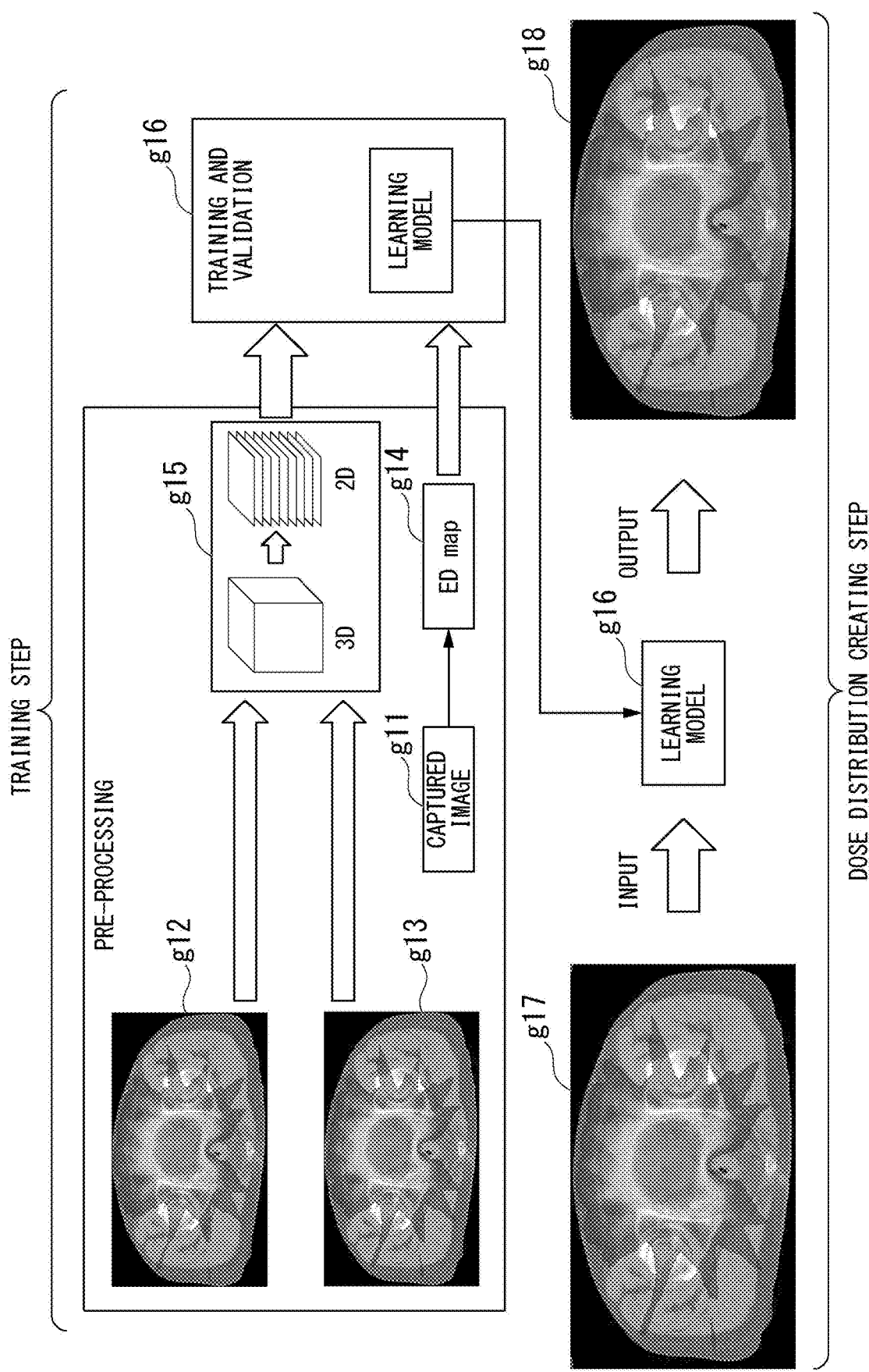
FIG. 1 is a diagram showing an outline of a dose distribution creating processing in consideration of influence of a magnetic field according to an embodiment.

Hereinafter, an embodiment of the present invention will be described with reference to the drawings. In the drawings to be used in the following description, a scale of each member is appropriately changed in order to make each member recognizable. In the following description, a case in which an apparatus includes an MR image-capturing device, a computed tomography (CT) image-capturing device, and an MR-Linac will be described as an example, but a method of the present embodiment can also be applied to other devices and systems.

<Outline of Dose Distribution Creating Processing in Consideration of Influence of Magnetic Field>

FIG. 1 is a diagram showing an outline of a dose distribution creating processing in consideration of influence of a magnetic field according to the present embodiment. As shown in FIG. 1, the dose distribution creating processing in consideration of influence of a magnetic field includes a learning step and a dose distribution creating step.

In the learning step, an image-capturing device, which is the MR image-capturing device or the CT image-capturing device provided in a dose distribution creating apparatus, captures an image (captured image) g11 (MR image or CT image of a subject) not in a magnetic field or in a magnetic field. Next, the dose distribution creating apparatus calculates and acquires the captured image g11, and a dose distribution g12 not in a magnetic field and a dose distribution g13 in a magnetic field based on the captured image. Next, the dose distribution creating apparatus divides the dose distribution g12 not in a magnetic field and the dose distribution g13 in a magnetic field from a three-dimensional state into two-dimensional information (g15). Next, the dose distribution creating apparatus inputs the two-dimensional dose distribution not in a magnetic field, the two-dimensional dose distribution in a magnetic field, and electron density map (ED map) information g14 generated based on the captured image g11 or the captured image g11 to a learning model g16 to perform supervised learning. In the following description, "the electron density map (ED map) information generated based on the captured image or the captured image" is also referred to as "information based on the captured image". The dose distribution includes a distribution parallel to an irradiation direction of radiation (parallel three-dimensional distribution or plural perpendicular two-dimensional distributions) or a plurality of perpendicular tomographic (two-dimensional) images. In addition, the dose distribution may be a dose distribution calculated using photon beams, a dose distribution calculated using charged particle beams, or other dose distributions. In addition, a dose distribution not in a magnetic field for pre-training and input at the time of treatment includes a normalized distribution or a normalized plurality of tomographic images, and a dose distribution in a magnetic field is a plurality of tomographic images obtained by correcting each pixel value with a coefficient representing influence of a magnetic field (for example, the maximum pixel value in a magnetic field/the maximum pixel value not in a magnetic field) after being normalized.

The dose distribution creating apparatus may input the dose distribution g12 not in a magnetic field and the dose distribution g13 in a magnetic field to the learning model g16 as they are in the three-dimensional state without dividing them from the three-dimensional state into the two-dimensional information. In addition, the dose distribution creating apparatus tunes the learning model g16 so as to match the dose distribution in a magnetic field which is training data. As described above, in the present embodiment, the learning model is trained using the information based on the captured image, the dose distribution not in a magnetic field, and the dose distribution in a magnetic field.

In the dose distribution creating step, the MR-Linac provided in the dose distribution creating apparatus acquires a captured image not in a magnetic field or in a magnetic field on the day of treatment. The dose distribution creating apparatus calculates and acquires a dose distribution not in a magnetic field based on the captured image. Next, the dose distribution creating apparatus inputs a dose distribution g17 not in a magnetic field divided two-dimensionally and the information based on the captured image to the trained learning model g16. Next, the dose distribution creating apparatus creates a dose distribution g18 in a magnetic field using the trained learning model g16.

<Configuration Example of Dose Distribution Creating Apparatus>

Figure 2:
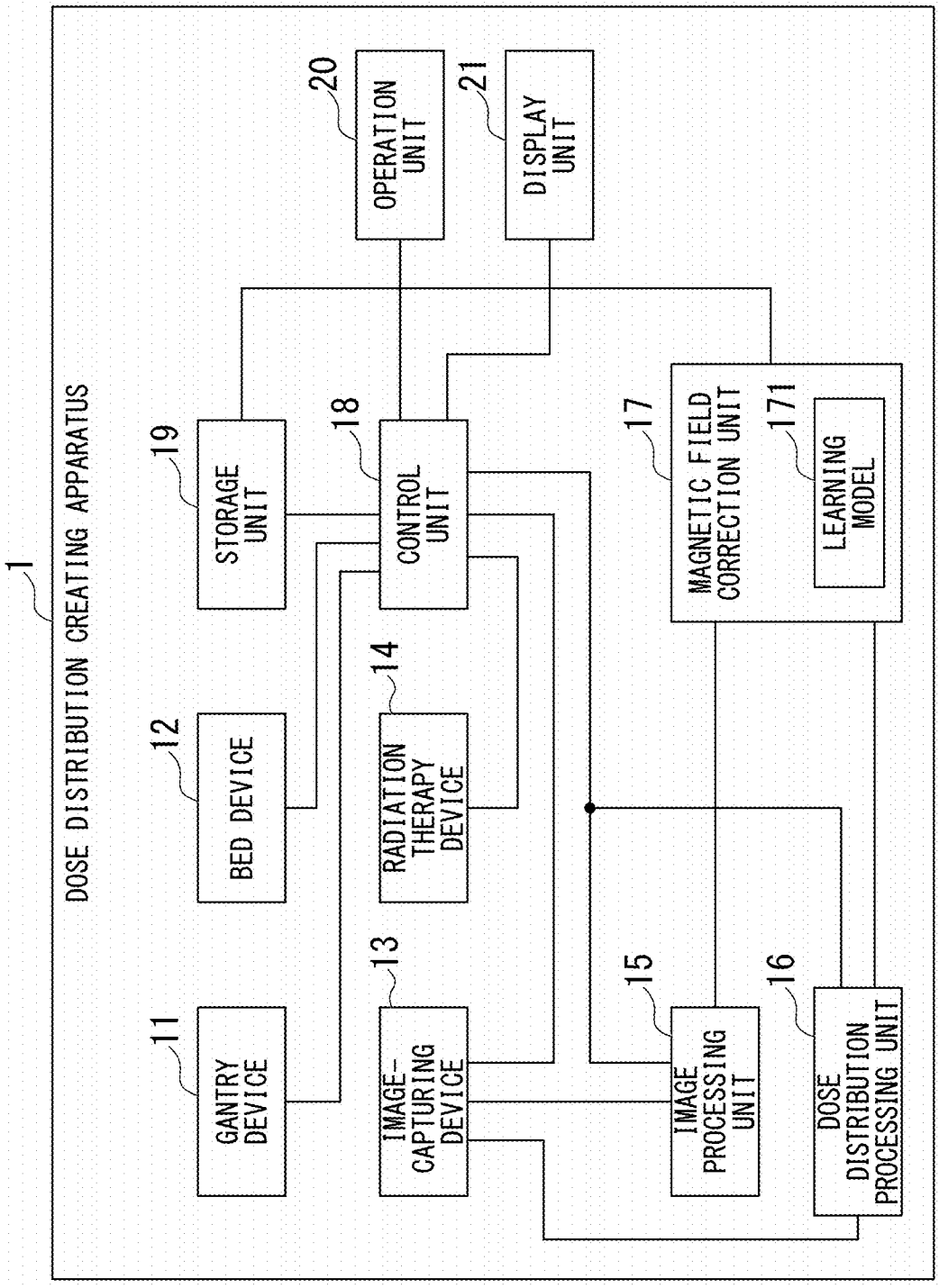
FIG. 2 is a block diagram showing a configuration example of a dose distribution creating apparatus according to the embodiment.

Next, a configuration example of the dose distribution creating apparatus will be described. FIG. 2 is a block diagram showing the configuration example of the dose distribution creating apparatus according to the present embodiment. As shown in FIG. 2, a dose distribution creating apparatus 1 includes a gantry device 11, a bed device 12, an image-capturing device 13, a radiation therapy device 14, an image processing unit 15 (acquisition unit and processing unit), a dose distribution processing unit 16 (acquisition unit and processing unit), a magnetic field correction unit 17, a control unit 18, a storage unit 19, an operation unit 20, and a display unit 21. In addition, the magnetic field correction unit 17 includes a learning model 171.

The dose distribution creating apparatus 1 includes an image-capturing device such as an MR image-capturing device, a CT image-capturing device, and an MR-Linac.

The gantry device 11 is a device for capturing an image of a subject. The gantry device 11 is attached to the image-capturing device 13 and the radiation therapy device 14.

The bed device 12 is, for example, a device on which the subject lies. The bed device 12 may be a bed or the like that is manually moved by a photographer (at least one of a photographer and a photography assistant), and the control unit 18 may control an operation.

The image-capturing device 13 is an MR image-capturing device or a CT (Computed Tomography) image-capturing device. The image-capturing device 13 captures an image of a patient according to the control of the control unit 18, and outputs the captured image to the image processing unit 15. The captured image is an MR image or a CT image not in a magnetic field or in a magnetic field.

The radiation therapy device 14 is, for example, a linear accelerator (Linac). The radiation therapy device 14 performs a treatment based on a treatment plan according to the control of the control unit 18.

The image processing unit 15 acquires the image captured by the image-capturing device 13. The image processing unit 15 generates ED map information based on the acquired captured image, normalizes the generated ED map information, and inputs the normalized ED map information to the learning model 171 of the magnetic field correction unit 17. Alternatively, the image processing unit 15 normalizes the acquired captured image and inputs the normalized image to the learning model 171 of the magnetic field correction unit 17.

The dose distribution processing unit 16 acquires a captured image from the image-capturing device 13. The dose distribution processing unit 16 calculates a dose distribution on the acquired captured image, and acquires a dose distribution not in a magnetic field and a dose distribution in a magnetic field for each gate. At the time of training, the dose distribution processing unit 16 uses the dose distribution not in a magnetic field and the dose distribution in a magnetic field. In addition, at the time of treatment, the dose distribution processing unit 16 may calculate only the dose distribution not in a magnetic field and may not calculate the dose distribution in a magnetic field. The gate is, for example, one gate, opposite two gates, orthogonal two gates, oblique incidence two gates, four-gate cross fire, and multiple gates in a fixed irradiation method. In addition, the dose distribution processing unit 16 calculates the dose distribution not in a magnetic field by using, for example, an anisotropic analytical algorithm (AAA) method, a collapsed cone convolution (CCC) method, and a monte carlo method. In addition, the dose distribution processing unit 16 calculates the dose distribution in a magnetic field by using, for example, the monte carlo method. The dose distribution processing unit 16 performs the following first processing and second processing on three-dimensional information and further divides the three-dimensional information into two-dimensional information.

First processing: the dose distribution not in a magnetic field is normalized to a value between 0 and 1, for example.

Second processing: the dose distribution in a magnetic field is normalized to a value between 0 and 1, for example, and multiplied by a coefficient {for example, (the maximum value (in a magnetic field)/the maximum value (not in a magnetic field)}.

The dose distribution processing unit 16 may not divide the three-dimensional information into the two-dimensional information.

Based on a CT-relative electron density conversion table (CT-ED Table) used for dose calculation stored in the storage unit 19, the dose distribution processing unit 16 creates an ED map by normalizing the CT-ED Table with a lower limit of 0 and an upper limit of 1. The ED map is two-dimensional information.

At the time of training, the magnetic field correction unit 17 trains the learning model 171 using the dose distribution in a magnetic field as training data and using the information based on the captured image and the dose distribution not in a magnetic field. A training method will be described later. At the time of treatment, the magnetic field correction unit 17 inputs the normalized dose distribution not in a magnetic field and the ED map information generated based on the normalized captured image or the captured image, and corrects the dose distribution for each gate using the trained learning model. A configuration example of the learning model 171 will be described later.

The control unit 18 controls each functional unit and each device using operation information acquired by the operation unit 20 and information stored in the storage unit 19.

The storage unit 19 stores a CT value electron density conversion table (CT-ED Table).

Image-capturing conditions or the like included in an operation result acquired by the operation unit 20 are stored. The storage unit 19 stores a control program, a threshold value, and the like.

The operation unit 20 is, for example, a touch panel sensor provided on the display unit 21, a mechanical switch, a keyboard, and a mouse. The operation unit 20 detects an operation result operated by a user and outputs the detected operation result to the control unit 18.

The display unit 21 is, for example, a liquid crystal image display device, an organic electro luminescence (EL) image display device, or a mobile terminal such as a tablet. The display unit 21 displays a presentation image output by the control unit 18.

The image processing unit 15, the dose distribution processing unit 16, the magnetic field correction unit 17, and the control unit 18 may be, for example, a personal computer, a central processing unit (CPU), and a digital signal processor (DSP).

<Electron Density Map>

Figure 3:
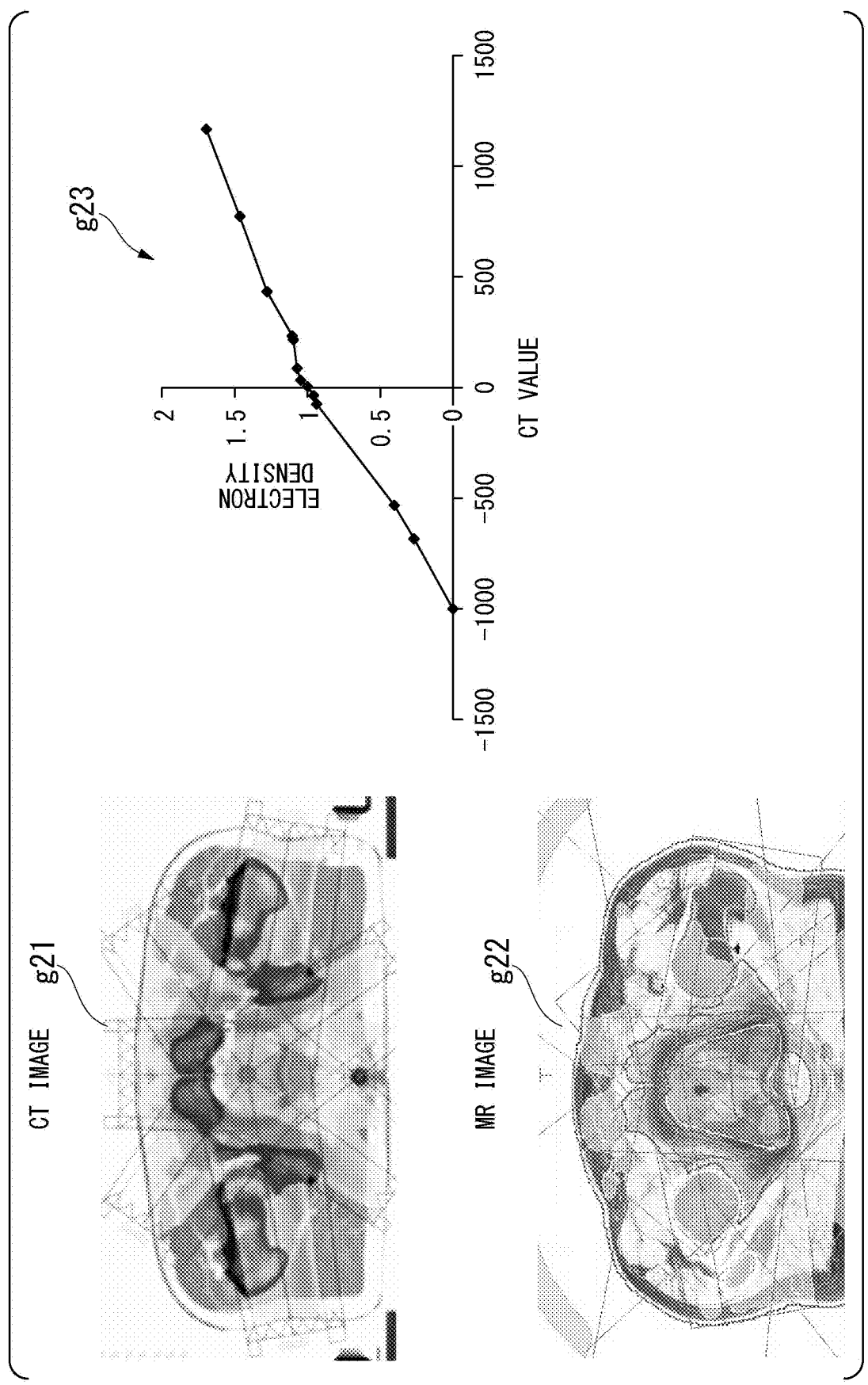
FIG. 3 is a diagram showing a CT value electron density conversion table.

Here, the electron density map (ED map) will be described. FIG. 3 is a diagram showing the CT value electron density conversion table.

A value directly affecting dose calculation is an electron density. The CT value electron density conversion table is a map (g23) for converting a CT value (CT image g21) or an MR value (MR image g22) of each voxel into an electron density. In the map g23, a horizontal axis represents a CT value [HU], and a vertical axis represents an electron density [g/cm$^3$]. The image processing unit 15 converts a CT image into an electron density to create an electron density map using the conversion table.

<Magnetic Field Correction Model>

Figure 4:
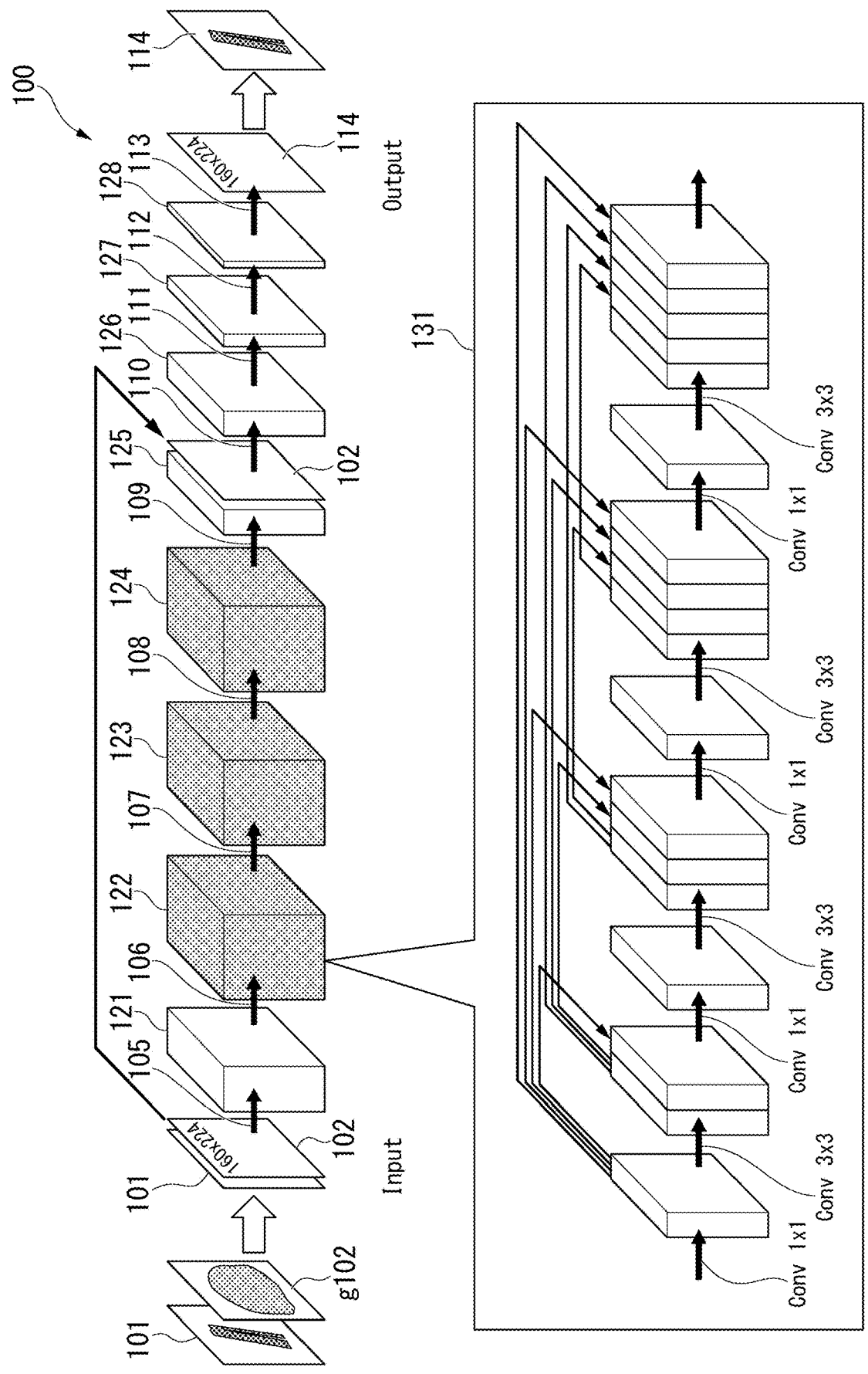
FIG. 4 is a diagram showing an example of a magnetic field correction model according to the embodiment.

Here, an example of a magnetic field correction model, which is a learning model, will be described. FIG. 4 is a diagram showing the example of the magnetic field correction model according to the present embodiment. A magnetic field correction model 100, which is a learning model in FIG. 4, is an example based on convolutional neural networks (CNN) and DenseNet (Reference Literature 1). In addition, in the magnetic field correction model 100 of the present embodiment, in order to emphasize a local feature, down sampling such as pooling or compression is not used.

Reference Literature 1: Gao Huang, Zhuang Liu, etc., "Densely Connected Convolutional Networks", 2017 IEEE Conference on Computer Vision and Pattern Recognition (CVPR), IEEE, 2017

The magnetic field correction model 100 is connected, for example, in order of a convolution layer 121, a dense block 122, a dense block 123, a dense block 124, a convolution layer 125, a convolution layer 126, a convolution layer 127, and a convolution layer 128.

The magnetic field correction model 100 receives a two-dimensional dose distribution 101 not in a magnetic field and a two-dimensional ED map 102. A resolution of the ED map 102 is, for example, 160×224.

In addition, the magnetic field correction model 100 inputs the ED map 102 again at any position after the dense blocks, for example, between the convolution layer 125 and the convolution layer 126.

First, convolution with a filter size of 3×3 is performed for the input (105).

Next, the dense blocks 122 to 124 perform a processing in dense blocks (106 to 108).

Next, convolution with a filter size of 1×1 is performed (109).

Next, convolution with a filter size of 3×3 is performed using an output of the convolution layer 125 and the ED map 102 as inputs (110).

Next, convolution with a filter size of 3×3 is performed (111 and 112).

Next, convolution with a filter size of 1×1 is performed (113).

An output of the magnetic field correction model 100 is a two-dimensional dose distribution 114 in a magnetic field, and a resolution is, for example, 160×224.

A diagram of a region indicated by a reference sign 131 is an image diagram of a dense block. The dense block is used such that all outputs from the front layers are input to the rear layers.

In addition, in the dense block, in order to maximize transmission of information between layers, layers having the same feature data size are coupled to each other, and in order to maintain backward propagation, an output of a layer before a certain layer is used as an input. In addition, the dense block alternately includes convolution 1×1 and convolution 3×3, which are referred to as bottle neck.

In the example shown in FIG. 4, the example in which the ED map is input to any layer after the dense blocks is described, but the input to any layer after the dense blocks may be a CT image (or MR image) of the subject or an image obtained by normalizing the CT image (or MR image) and cutting the normalized image two-dimensionally.

The configuration example of the magnetic field correction model 100 and the dense blocks shown in FIG. 4 is an example, and the number of layers, the number of filters, and the like are not limited thereto. In addition, in the example shown in FIG. 4, the network is described as the example of the CNN, the network may be another network, for example, a recurrent neural network (RNN).

The magnetic field correction model 100 of the present embodiment includes the dense blocks and inputs the ED map 102 again at any position after the dense blocks. In the dense blocks, for example, influence of secondary electrons in a magnetic field is corrected. Accordingly, according to the present embodiment, an anatomical structure can be reflected.

<Processing at Time of Training>

Figure 5:
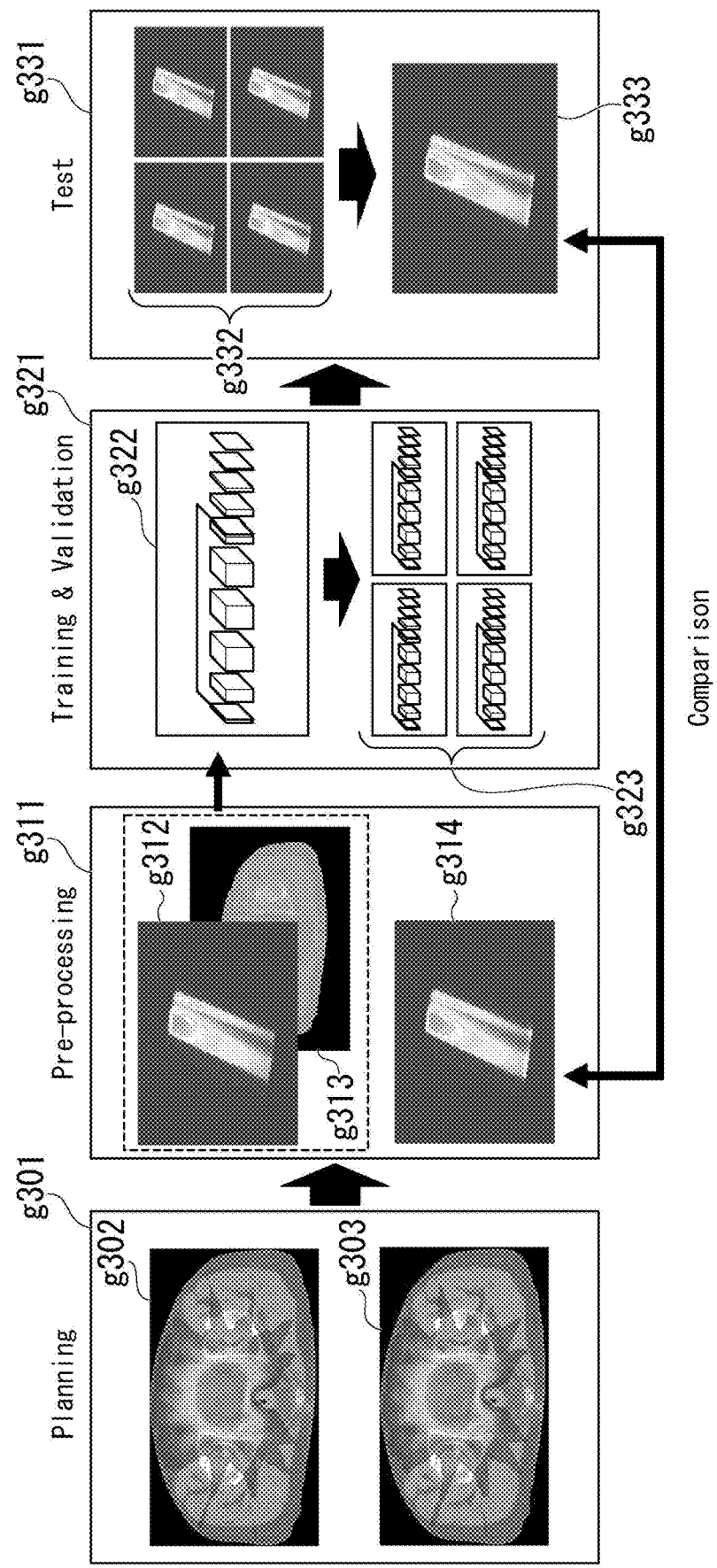
FIG. 5 is a diagram showing a processing example at the time of training according to the embodiment.

Next, a processing example at the time of training will be described. FIG. 5 is a diagram showing a processing example at the time of training according to the present embodiment. In the following processing example, an example will be described in which the electron density map (ED map) information is used as the information based on the captured image, and the two-dimensional information cut out from the three-dimensional state is input to the learning model.

(1) Image-Capturing Step g301

The image-capturing device 13 captures an image g302 (MR image or CT image) not in a magnetic field or in a magnetic field. Next, the dose distribution creating apparatus 1 acquires the captured image. Next, the dose distribution processing unit 16 calculates and acquires a dose distribution not in a magnetic field and a dose distribution in a magnetic field based on the acquired captured image.

(2) Pre-Processing Step g311

The dose distribution creating apparatus 1 inputs a divided two-dimensional dose distribution g312 not in a magnetic field and electron density map (ED map) information g313 generated based on the captured image using the CT value electron density conversion table to a learning model (magnetic field correction model) g322. In addition, a dose distribution g314 in a magnetic field is used as training data.

(3) Training and Validation Step g321

The dose distribution creating apparatus 1 performs training and validation by using a 4-fold cross validation method with four divided learning models g323.

(4) Test Step g331

The dose distribution creating apparatus 1 combines and averages dose distributions g332 in a magnetic field estimated for the respective four divided learning models g323 to create a corrected dose distribution g333 in a magnetic field.

The dose distribution creating apparatus 1 compares the dose distribution g333 in a magnetic field with the dose distribution g314 in a magnetic field, which is the correct data, creates a reward based on the comparison result, and reflects the reward in training. Since the dose distribution g314 in a magnetic field, which is the correct data, is used at the time of training, there is no problem even if it takes time to calculate, and thus, a behavior of a radiation beam inside the patient is calculated with a magnetic field constantly generated.

The processing in FIG. 5 is described by omitting the processing such as the above-described normalization.

<Method>

Next, an example of a work procedure will be described. First, a processing example at the time of training will be described.

Figure 6:
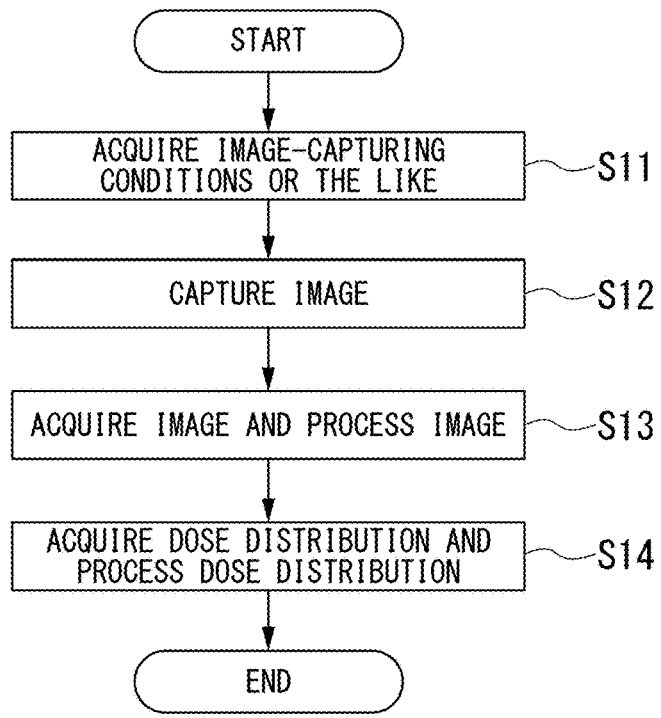
FIG. 6 is a flowchart showing a processing procedure example of training a learning model according to the embodiment.

FIG. 6 is a flowchart showing a processing procedure example according to the present embodiment. Also in the following processing example, an example will be described in which the electron density map (ED map) information is used as the information based on the captured image, and the two-dimensional information cut out from the three-dimensional state is input to the learning model.

(Step S11) The operation unit 20 acquires image-capturing conditions or the like for training.

(Step S12) The image-capturing device 13 captures an image of the subject according to the control of the control unit 18 for training.

(Step S13) The image processing unit 15 acquires an image (CT image or MR image) captured by the image-capturing device 13. Subsequently, the image processing unit 15 generates an electron density map based on the captured image using the CT value electron density conversion table, and normalizes the generated electron density map.

(Step S14) The dose distribution processing unit 16 acquires the captured image from the image-capturing device 13. Subsequently, the dose distribution processing unit 16 calculates and acquires a dose distribution not in a magnetic field and a dose distribution in a magnetic field based on the captured image. Subsequently, the dose distribution processing unit 16 three-dimensionally normalizes the dose distribution in a magnetic field and the dose distribution not in a magnetic field, and further divides them two-dimensionally.

(Step S15) The magnetic field correction unit 17 trains the learning model 171 using the electron density map generated based on the captured image by the image processing unit 15 and the dose distribution not in a magnetic field and the dose distribution in a magnetic field calculated by the dose distribution processing unit 16.

Next, a procedure example at the time of treatment will be described.

Next, a procedure example at the time of treatment will be described.

Figure 7:
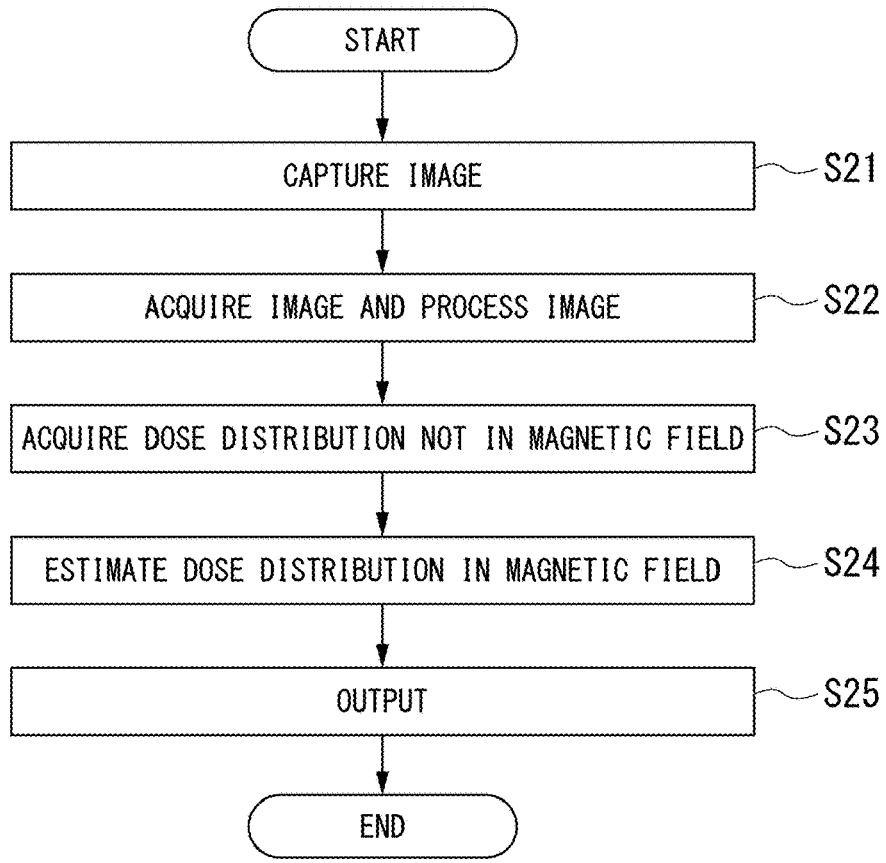
FIG. 7 is a flowchart showing a processing procedure example of estimating a dose distribution in a magnetic field according to the embodiment.

FIG. 7 is a flowchart showing a processing procedure example of estimating a dose distribution in a magnetic field according to the present embodiment. In the following processing example, an example will be described in which the electron density map (ED map) information is used as the information based on the captured image, and the two-dimensional information cut out from the three-dimensional state is input to the learning model.

(Step S21) The operation unit 20 acquires image-capturing conditions or the like for treatment. The image-capturing device 13 captures an image of the subject according to the control of the control unit 18 for treatment. The processing may be omitted. The dose distribution creating apparatus 1 may acquire and use, for example, an image captured in advance.

(Step S22) The image processing unit 15 acquires an image (CT image or MR image) captured by the image-capturing device 13 or the image captured in advance. Subsequently, the image processing unit 15 generates an electron density map based on the captured image using the CT value electron density conversion table, and normalizes the generated electron density map.

(Step S23) The dose distribution processing unit 16 acquires the captured image from the image-capturing device 13. Subsequently, the dose distribution processing unit 16 calculates and acquires a dose distribution not in a magnetic field based on the captured image. Subsequently, the dose distribution processing unit 16 three-dimensionally normalizes the dose distribution not in a magnetic field, and further divides the normalized dose distribution two-dimensionally.

(Step S24) The magnetic field correction unit 17 inputs the dose distribution not in a magnetic field and the electron density map generated based on the captured image to the learning model 171 to estimate a dose distribution in a magnetic field.

(Step S25) The control unit 18 displays on the display unit 21 the estimated dose distribution in a magnetic field.

In the above-described processing, at the time of training or treatment, the dose distribution processing unit 16 may not convert the dose distribution from three dimensions to two dimensions. In this case, the dose distribution processing unit 16 may normalize the three-dimensional dose distribution and input the normalized dose distribution to the learning model 171.

In addition, in step S24 of the above-described processing, the control unit 18 may create a treatment plan based on the estimated dose distribution in a magnetic field, and displays on the display unit 21 the created treatment plan as well.

<Validation Result>

Next, the training of the learning model according to the present embodiment and validation results of estimation using the trained learning model will be described.

Figure 8:
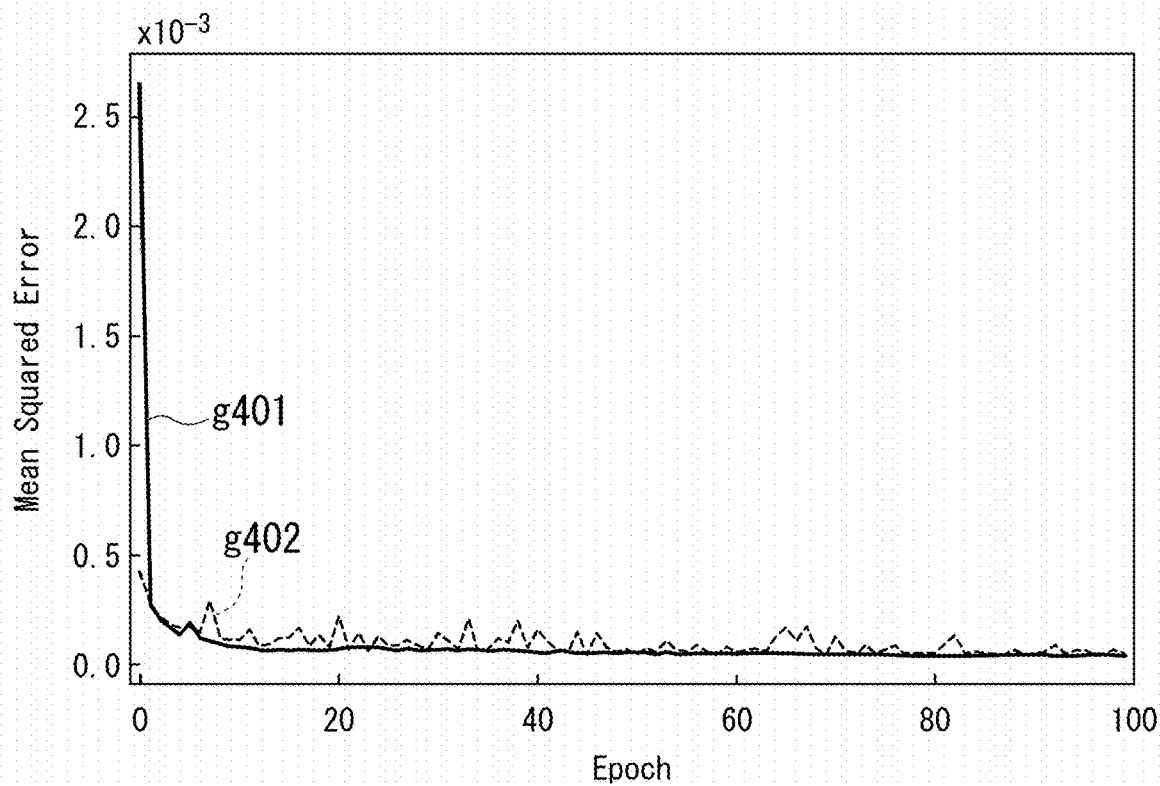
FIG. 8 is a diagram showing a learning curve.

FIG. 8 is a diagram showing a learning curve. In FIG. 8, a horizontal axis represents the number of times of training (epoch number), and a vertical axis represents a mean squared error (MSE) [$\times 10^{-3}$]. A polygonal line g401 is a loss characteristic of training data, and a polygonal line g402 is a loss characteristic of verification data. As shown in FIG. 8, the MSE converges after plural times of training.

Figure 9:
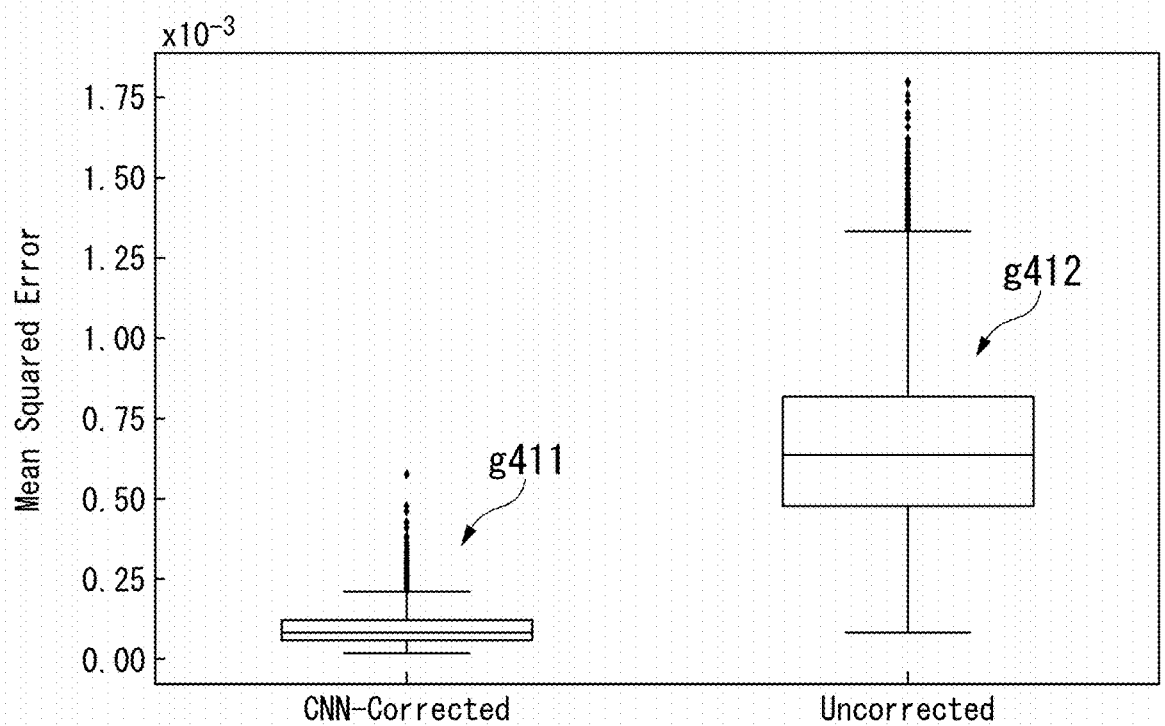
FIG. 9 is a diagram showing a dose error.

FIG. 9 is a diagram showing a dose error. In FIG. 9, a vertical axis represents MSE [$\times 10^{-3}$]. A reference sign g411 indicates a dose error when correction according to the present embodiment using the dense blocks in the CNN is performed, and a reference sign g412 indicates a dose error when no correction is performed. As shown in FIG. 9, the MSE is improved to ⅓ or less when corrected by using a method of the present embodiment.

Next, an example of a first dose distribution and a profile will be described.

Figure 10:
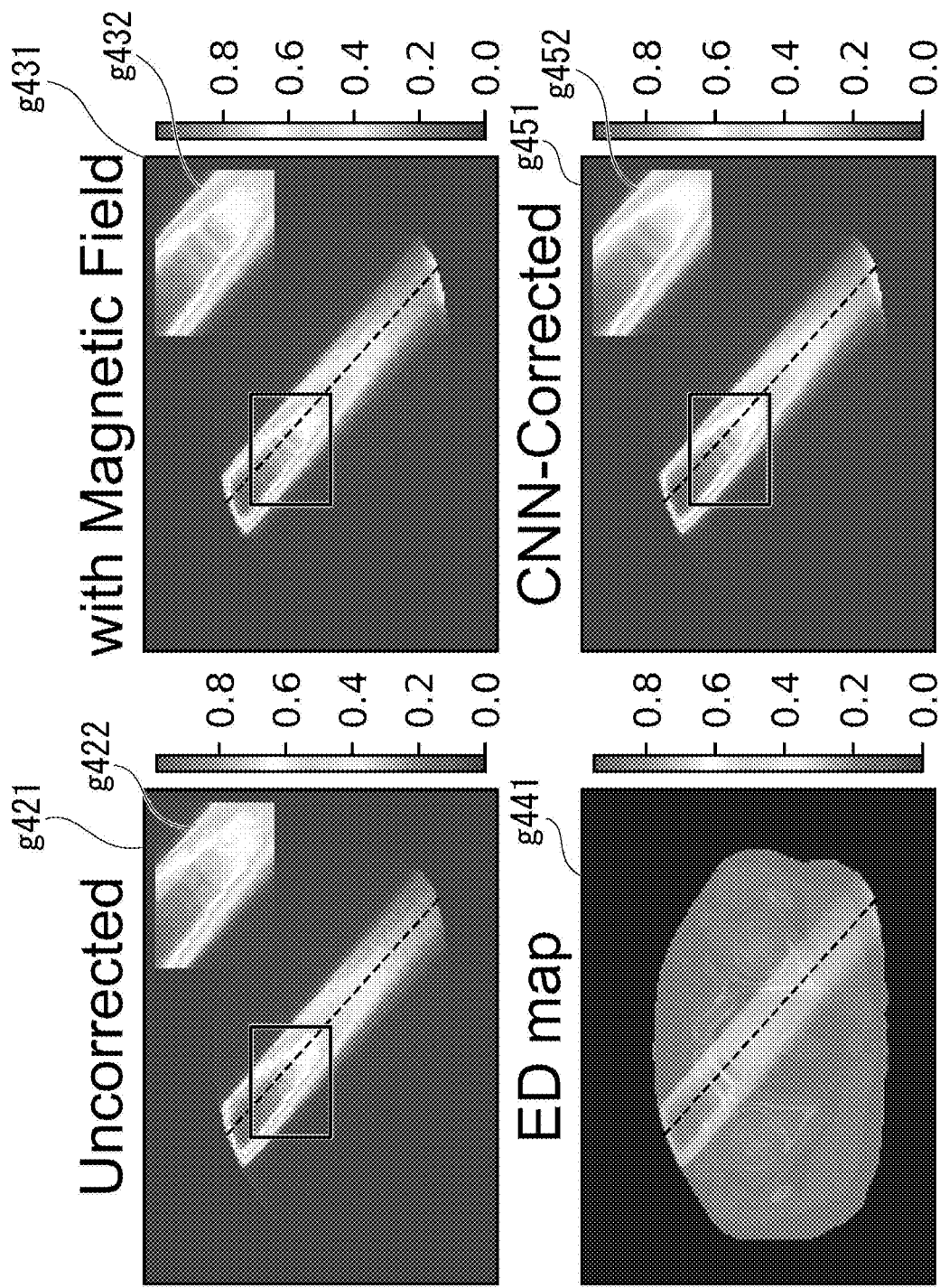
FIG. 10 is a diagram showing a first example of a dose distribution.

FIG. 10 is a diagram showing a first example of a dose distribution.

The dose distribution g421 shows an uncorrected dose distribution not in a magnetic field, and an enlarged diagram g422 shows an enlargement of a part of the dose distribution g421. A dose distribution g431 shows an uncorrected dose distribution in a magnetic field, and an enlarged diagram g432 shows an enlargement of a part of the dose distribution g431. A reference sign g441 indicates an ED map. A dose distribution g451 shows a corrected dose distribution in a magnetic field according to the present embodiment, and an enlarged diagram g452 shows an enlargement of a part of the dose distribution g451. As shown in FIG. 10, when the correction according to the present embodiment is performed, the distribution of a lower right portion is different from the uncorrected distribution as in the enlarged diagram g452.

Next, the profile corresponding to FIG. 10 will be described.

Figure 11:
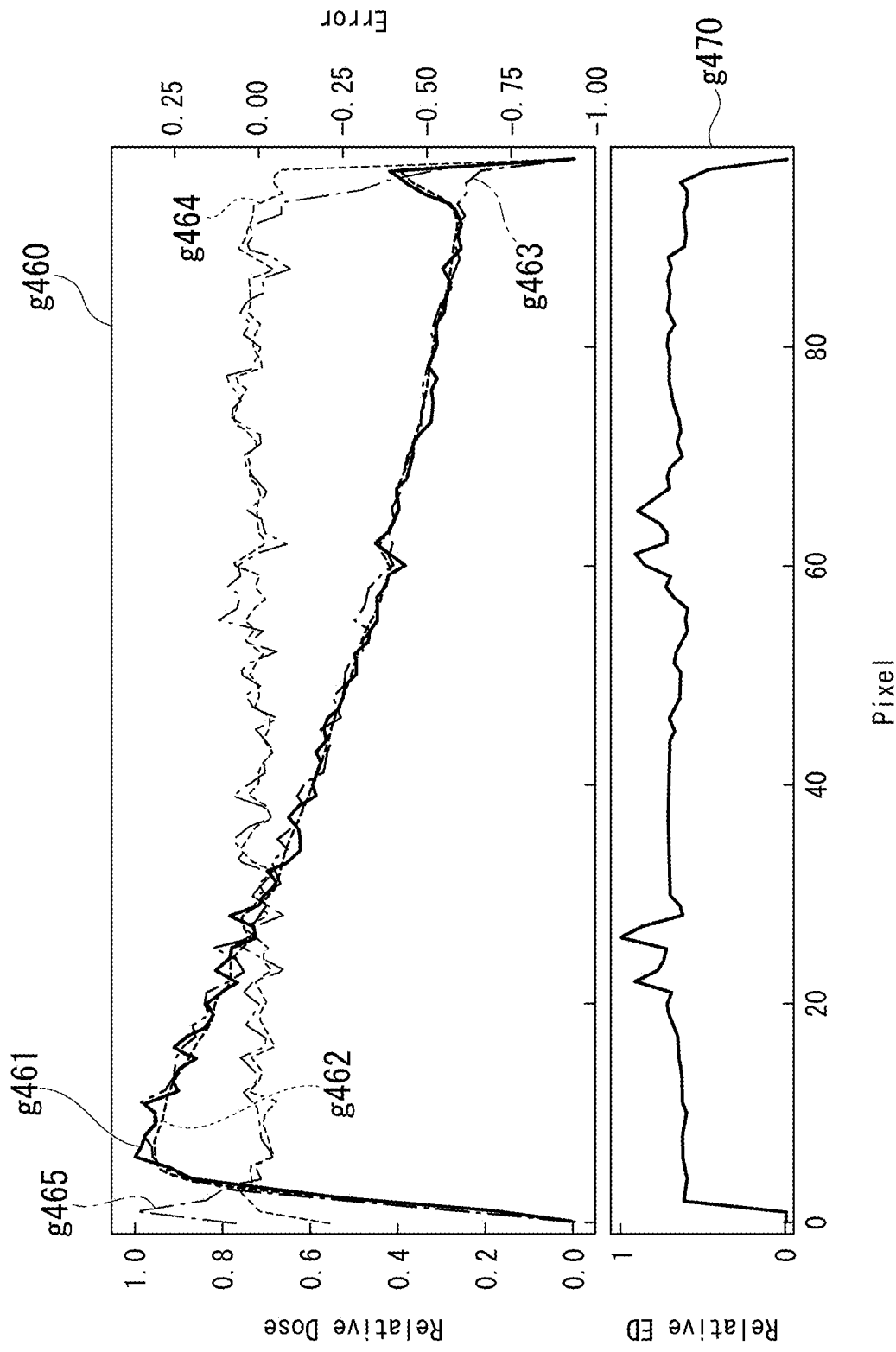
FIG. 11 is a diagram showing an example of a profile corresponding to FIG. 10.

FIG. 11 is a diagram showing the example of the profile corresponding to FIG. 10. In FIG. 11, a horizontal axis represents a pixel, a left vertical axis of a graph g460 represents a relative dose, a right vertical axis of the graph g460 represents an error, and a vertical axis of a graph g470 represents a relative electron density.

In addition, a solid line g461 indicates a relative dose in a dose distribution in a magnetic field, a broken line g462 indicates a relative dose in a dose distribution in a magnetic field corrected by using the method of the present embodiment, and a broken line g463 indicates a relative dose in a dose distribution in a magnetic field that is not corrected. Further, a broken line g464 indicates an error in the dose distribution in a magnetic field corrected by using the method of the present embodiment, and a broken line g465 indicates an error in the dose distribution in a magnetic field that is not corrected.

The pixel of about 90 or more corresponds to a lower right portion in the enlarged portion of the dose distribution shown in FIG. 10.

As shown in FIG. 11, when the correction is performed by using the method of the present embodiment, there is a difference between the relative dose and the error as compared with that when no correction is performed with the pixel of about 90 or more. When the correction is performed by using the method of the present embodiment, the error is fairly close to the relative dose in the dose distribution in a magnetic field indicated by the solid line g461 even when the number of pixels is about 90 or more as compared with that when no correction is performed. In addition, regarding the error, when the number of pixels is 90 or more, the number of errors increases when no correction is performed.

Next, an example of a second dose distribution and a profile will be described. The second dose distribution is an example of capturing an image of an intestine.

Figure 12:
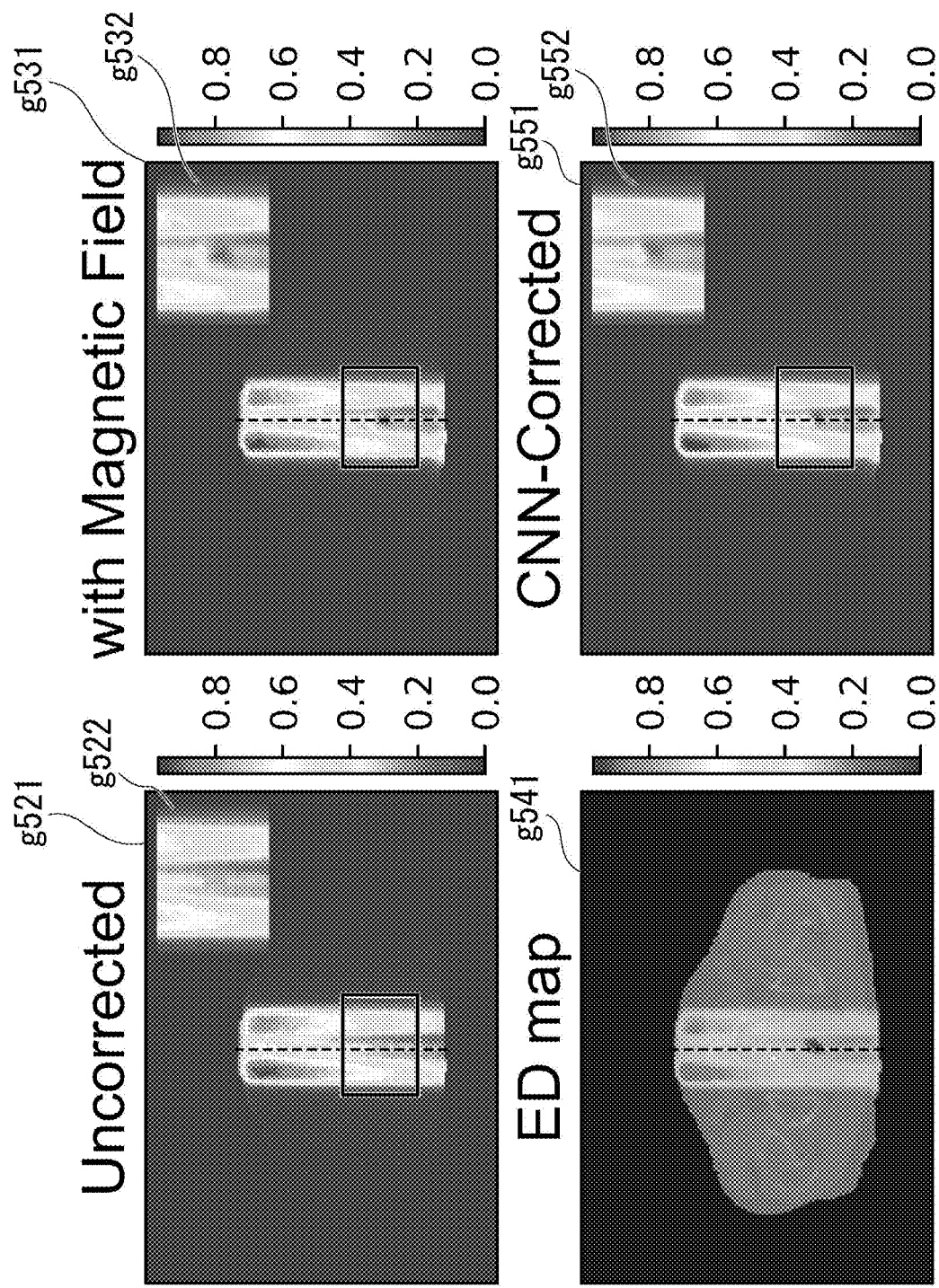
FIG. 12 is a diagram showing a second example of a dose distribution.

FIG. 12 is a diagram showing a second example of a dose distribution. A dose distribution g521 shows an uncorrected dose distribution not in a magnetic field, and an enlarged diagram g522 shows an enlargement of a part of the dose distribution g521. A dose distribution g531 shows an uncorrected dose distribution in a magnetic field, and an enlarged diagram g532 shows an enlargement of a part of the dose distribution g531. A reference sign g541 indicates an ED map. A dose distribution g551 shows a corrected dose distribution in a magnetic field according to the present embodiment, and an enlarged diagram g552 shows an enlargement of a part of the dose distribution g551. As shown in FIG. 12, when the correction according to the present embodiment is performed, the distribution of a lower portion is different from the uncorrected distribution as in the enlarged diagram g552.

Next, the profile corresponding to FIG. 12 will be described.

Figure 13:
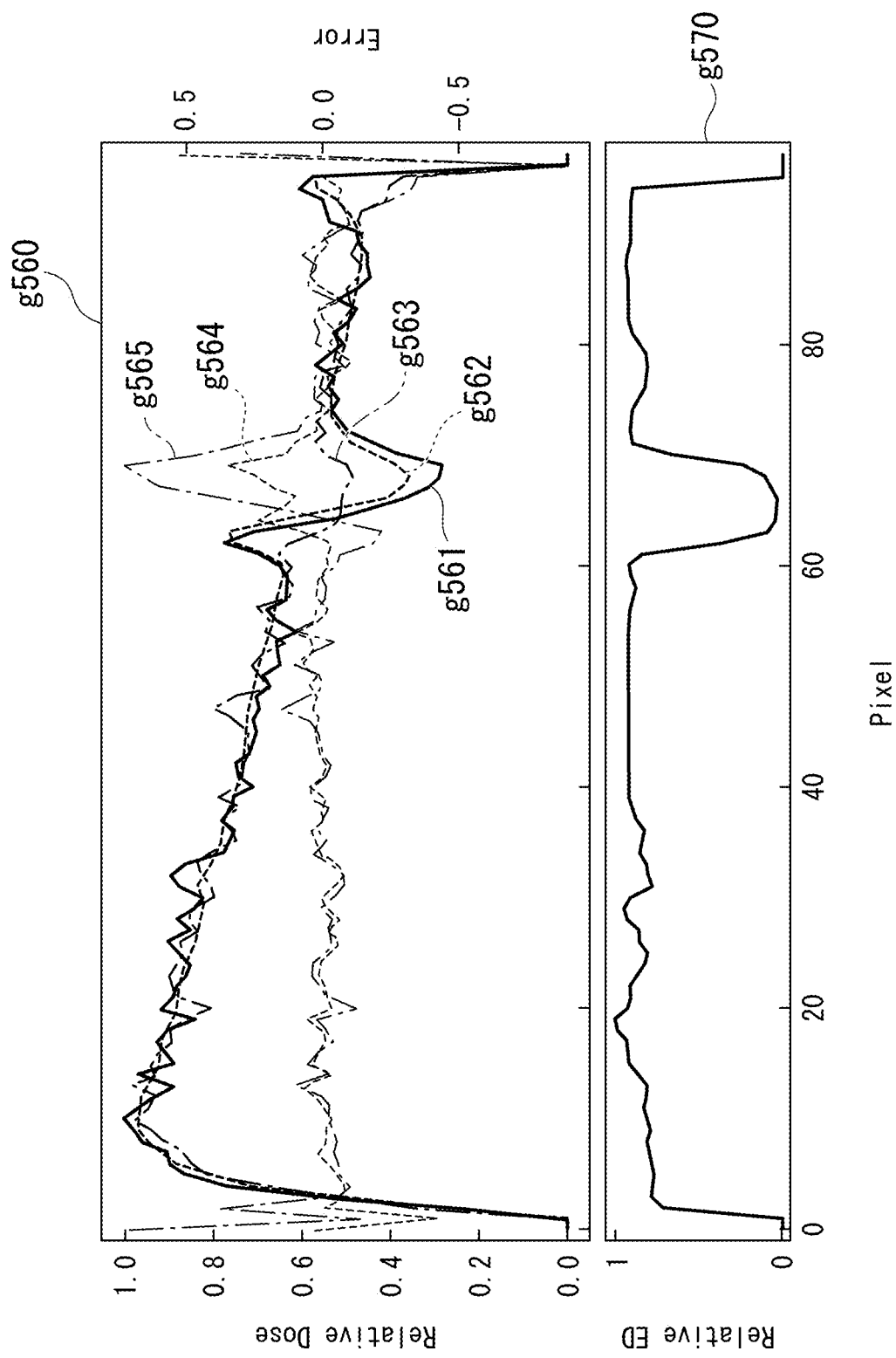
FIG. 13 is a diagram showing an example of a profile corresponding to FIG. 12.

FIG. 13 is a diagram showing the example of the profile corresponding to FIG. 12. In FIG. 13, a horizontal axis represents a pixel number (position), a left vertical axis of a graph g560 represents a relative dose, a right vertical axis of the graph g560 represents an error, and a vertical axis of a graph g570 represents a relative electron density.

In addition, a solid line g561 indicates a relative dose in a dose distribution in a magnetic field, a broken line g562 indicates a relative dose in a dose distribution in a magnetic field corrected by using the method of the present embodiment, and a broken line g563 indicates a relative dose in a dose distribution in a magnetic field that is not corrected. Further, a broken line g564 indicates an error in the dose distribution in a magnetic field corrected by using the method of the present embodiment, and a broken line g565 indicates an error in the dose distribution in a magnetic field that is not corrected.

The pixel of about 60 to 70 is a portion of a boundary line of the intestine and corresponds to a lower enlarged portion of the dose distribution in FIG. 12.

As shown in FIG. 13, when the correction is performed by using the method of the present embodiment, there is a difference between the relative dose and the error as compared with that when no correction is performed with the pixel of about 60 to 70. When the correction is performed by using the method of the present embodiment, the error is fairly close to the relative dose in the dose distribution in a magnetic field indicated by the solid line g561 even when the number of pixels is about 60 to 70 as compared with that when no correction is performed. In addition, regarding the error, when the number of pixels is 60 to 70, the number of errors increases when no correction is performed.

Next, an example of a gamma analysis result will be described with reference to FIGS. 14 and 15. When a Gamma passing rate is 100%, it means that two dose distributions completely match with each other.

Figure 14:
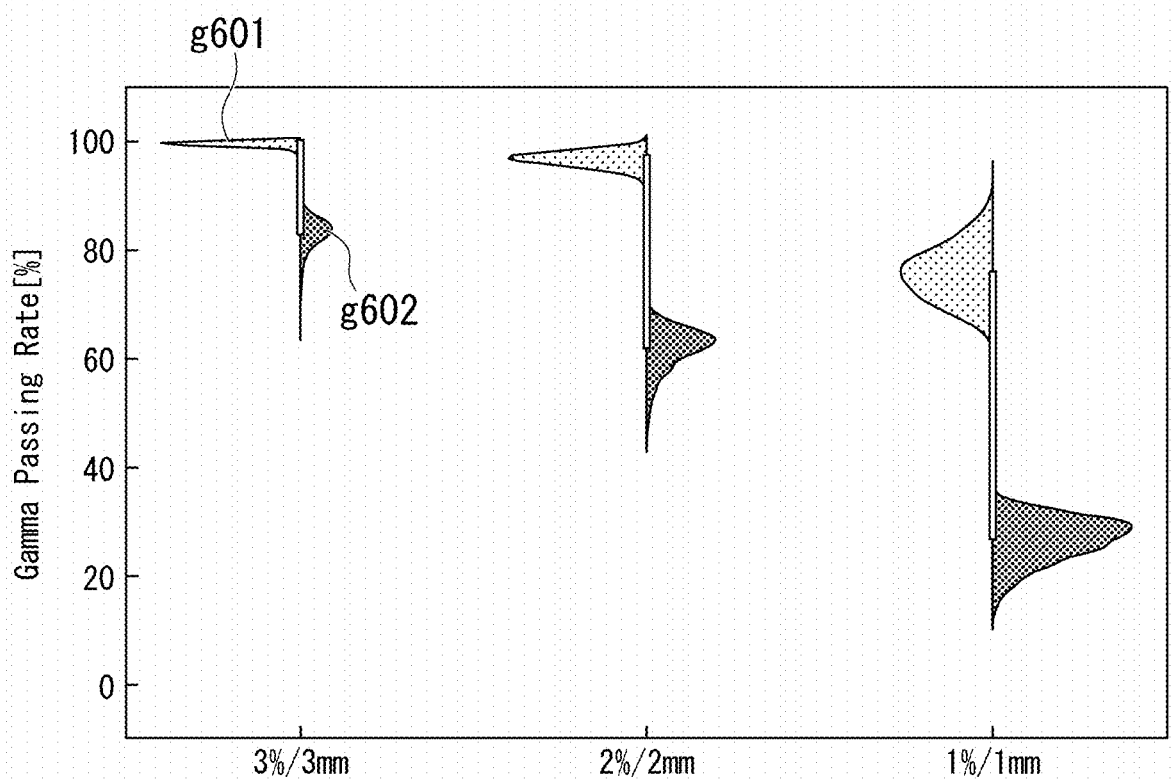
FIG. 14 is a diagram showing Gamma passing rates at all measurement points.

FIG. 14 is a diagram showing Gamma passing rates at all measurement points. FIG. 15 is a diagram showing a Gamma passing rate in a skin (3 mm). In FIGS. 14 and 15, a horizontal axis represents (ΔD [%]/Δd [mm]), and a vertical axis represents a Gamma passing rate [%]. ΔD [%] represents a dose difference, and Δd [mm] represents a distance to agreement (DTA). In addition, a hatched region g601 represents a case in which correction of the present embodiment is performed, and a hatched region g602 represents a case in which no correction is performed.

Figure 15:
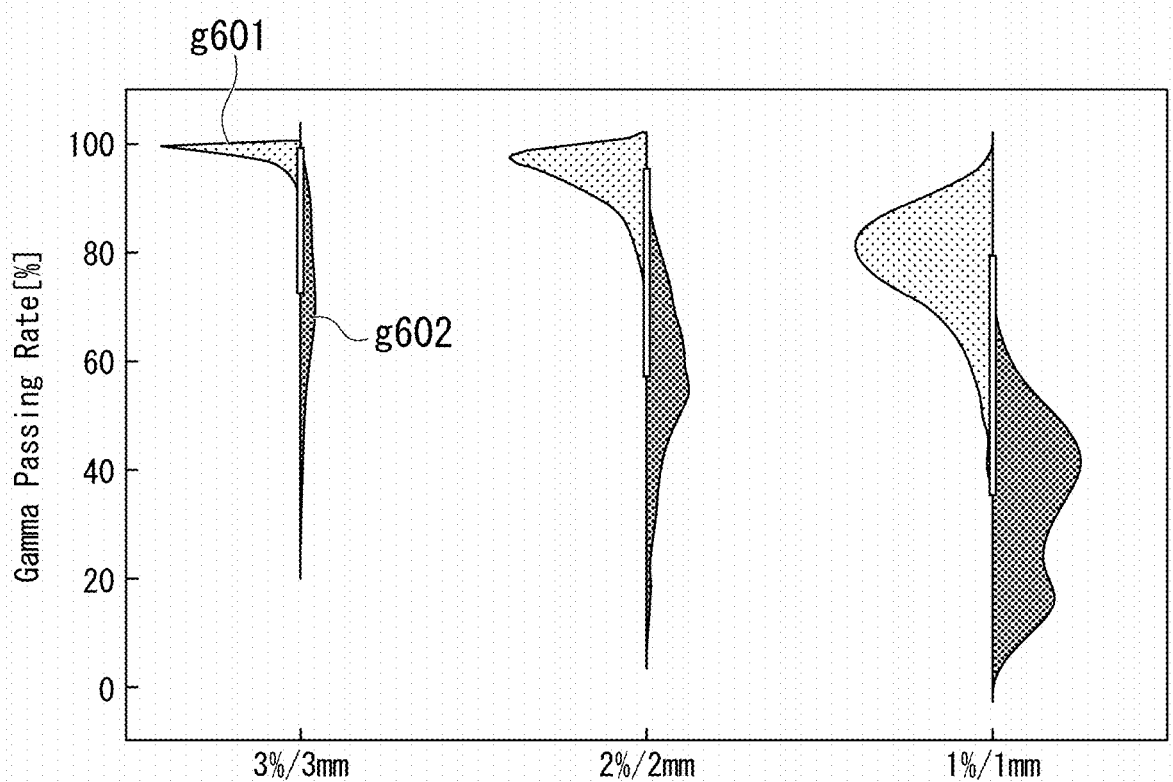
FIG. 15 is a diagram showing a Gamma passing rate in a skin (3 mm).

As shown in FIGS. 14 and 15, it can be seen that a dose distribution well matches (is close to 100%) with a dose distribution in a magnetic field, which is a true value, by performing the correction by using the method of the present embodiment.

In a general calculation algorithm in the related art, influence of the magnetic field cannot be taken into account. When a monte carlo algorithm is used, the influence of the magnetic field can be taken into account, but it takes about 10 to 20 minutes of calculation time. Therefore, in the related art, it is difficult to make a treatment plan after waiting for such an arithmetic processing result while keeping the subject lying on a bed at the time of treatment. Currently, no highly accurate and high-speed dose calculation algorithm in a magnetic field is present.

In contrast, according to the present embodiment, it is possible to perform correction in consideration of the influence of a magnetic field faster than in the related art.

<Example of Another Learning Model>

Next, an example of another learning model will be described.

Figure 16:
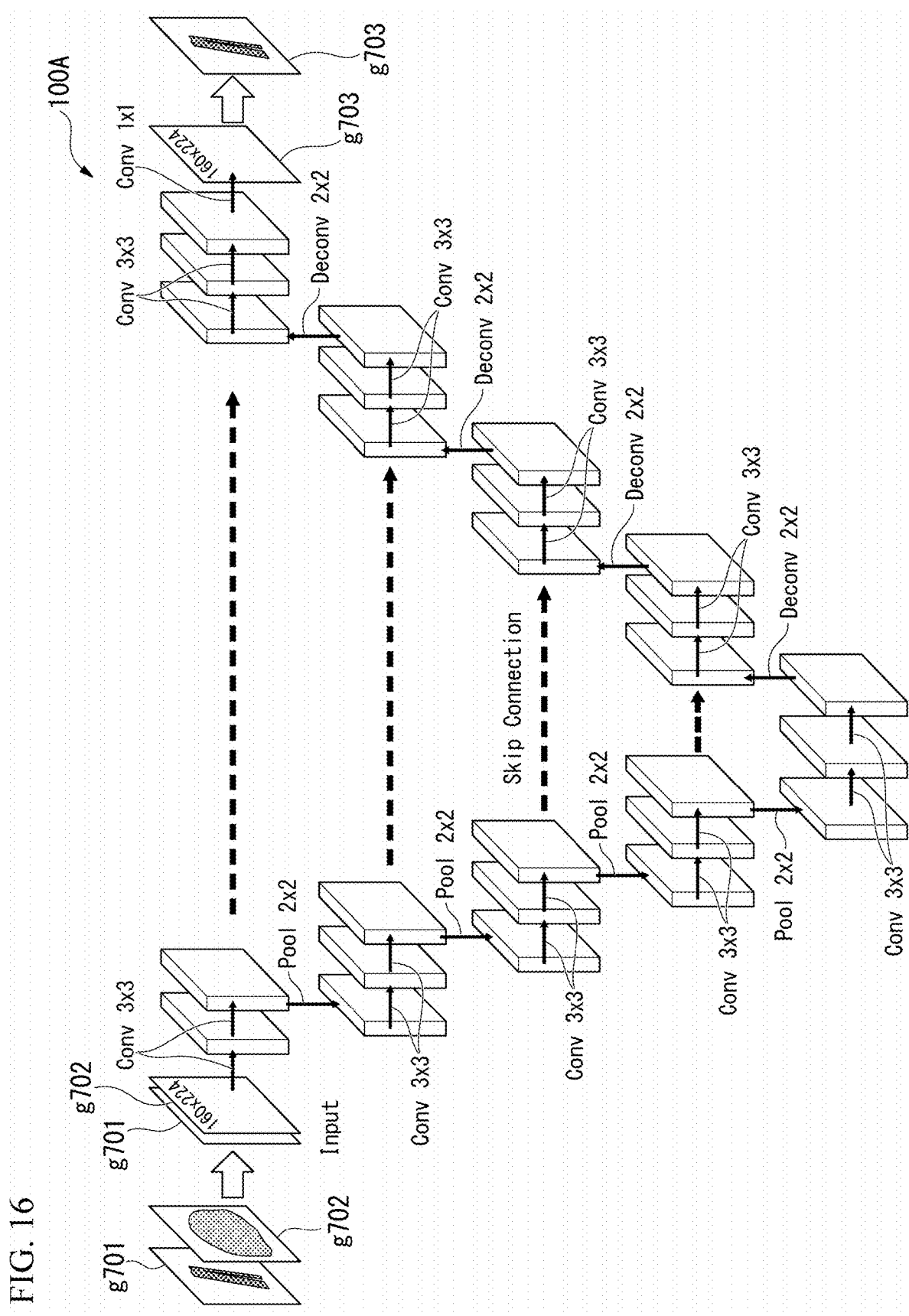
FIG. 16 is a diagram showing an example of another learning model according to the embodiment.

FIG. 16 is a diagram showing the example of another learning model according to the present embodiment. As shown in FIG. 16, a magnetic field correction model 100A, which is a learning model, is a CNN including skip connection (identity mapping). The skip connection has a bond that jumps over layers. In addition, each layer of the magnetic field correction model 100A is a convolution (Conv) layer 3×3, a convolution layer 1×1, a pooling (Pool) layer 3×3, or a deconvolution (Deconv) layer.

Even when the learning model is used, similar to the above-described embodiment, at the time of training, training data is a dose distribution in a magnetic field, and inputs are a dose distribution g701 not in a magnetic field and an electron density map g702 generated based on a captured image (or captured image). Inputs at the time of treatment are the dose distribution g701 not in a magnetic field and the electron density map g702 generated based on the captured image (or captured image). An output of the learning model is a dose distribution g703 in a magnetic field as in the above-described embodiment.

Even when the magnetic field correction model 100A is used, training is performed in advance as in the above-described embodiment, and the dose distribution g703 in a magnetic field is estimated. Even when the magnetic field correction model 100A is used, the dose distribution g703 in a magnetic field can be estimated faster and more accurately than in the related art.

The configuration shown in FIG. 15 is an example, and the number of layers, a resolution of input and output, and the like are not limited thereto.

In above-described the method, the dose distribution is also applied to a dose distribution at the time of capturing a CT image using X-rays (photon beams), a dose distribution at the time of capturing an MR image using a magnetic field and electrical waves, a dose distribution calculated using charged particle beams, and other dose distributions.

In addition, the method of the present embodiment can be used for deriving a final dose distribution used for treatment, and can be combined with an optimization process.

A program for implementing all or a part of functions of the dose distribution creating apparatus 1 according to the present invention may be recorded in a computer-readable recording medium, and all or a part of processing performed by the dose distribution creating apparatus 1 may be performed by causing a computer system to read and execute the program recorded in the recording medium. The "computer system" here includes an OS and hardware such as a peripheral device. In addition, the "computer system" also includes a WWW system having a home page providing environment (or display environment). In addition, the "computer-readable recording medium" refers to a portable medium such as a flexible disk, a magneto-optical disk, a ROM, and a CD-ROM, or a storage device such as a hard disk built into a computer system. Further, the "computer-readable recording medium" also includes one that holds a program for a certain period of time, such as a volatile memory (RAM) in a computer system serving as a server or a client when the program is transmitted via a network such as the Internet or a communication line such as a telephone line.

In addition, the program may be transmitted from the computer system in which the program is stored in a storage device or the like to another computer system via a transmission medium or a transmission wave in the transmission medium. Here, the "transmission medium" that transmits the program refers to a medium having a function of transmitting information, such as a network (communication network) such as the Internet or a communication line (communication wire) such as a telephone line. In addition, the program may be for implementing a part of the above-described functions. Further, the program may be a so-called difference file (difference program) that can implement the above-described functions in combination with a program already recorded in the computer system.

Although the embodiment of the present invention has been described above, the present invention is not limited to the embodiment, and various modifications and substitutions can be made without departing from the gist of the present invention.

REFERENCE SIGNS LIST

1: dose distribution creating apparatus
11: gantry device
12: bed device
13: image-capturing device
14: radiation therapy device
15: image processing unit
16: dose distribution processing unit
17: magnetic field correction unit
18: control unit
19: storage unit
20: operation unit
21: display unit
171: learning model

The invention claimed is:

1. A non-transitory computer readable storage medium storing a dose distribution creating program in consideration of influence of a magnetic field, the dose distribution creating program causing a computer to:
   acquire a captured image of a subject captured with a magnetic field and an electrical wave or a photon beam and a dose distribution not in a magnetic field calculated based on the captured image and normalized; and
   input the acquired dose distribution not in a magnetic field and information based on the acquired captured image to a learning model, and estimate a dose distribution in a magnetic field, the learning model including a plurality of layers and being trained to output a normalized dose distribution in a magnetic field when a normalized dose distribution not in a magnetic field and information based on a captured image are input.

2. The non-transitory computer readable storage medium according to claim 1, wherein the information based on the captured image is one of a CT image of the subject, an MR image of the subject, an electron density map generated based on the CT image of the subject, and an electron density map generated based on the MR image of the subject.

3. The non-transitory computer readable storage medium according to claim 1, wherein;
   the dose distribution not in a magnetic field, which is provided for pre-training and input, is a distribution image or a first plurality of tomographic images which are normalized,
   the dose distribution in a magnetic field is a second plurality of tomographic images obtained by correcting each pixel value with a coefficient representing influence of a magnetic field after being normalized, and
   wherein the distribution image is obtained parallel to an irradiation direction of radiation and the first plurality of tomographic images and the second plurality of tomographic images are obtained perpendicular to the irradiation direction.

4. The non-transitory computer readable storage medium according to claim 1, wherein:
   the learning model is a convolutional neural network including a dense block, and the computer inputs information based on an image of the subject captured with a photon beam or a charged particle beam to any layer after the dense block of the learning model including the plurality of layers.

5. The non-transitory computer readable storage medium according to claim 1, wherein the learning model is a convolutional neural network including skip connection.

6. A dose distribution creating method in consideration of influence of a magnetic field, the dose distribution creating method causing a computer to:
   acquire a captured image of a subject captured with a magnetic field and an electrical wave or a photon beam and a dose distribution not in a magnetic field calculated based on the captured image and normalized; and
   input the acquired dose distribution not in a magnetic field and information based on the acquired captured image to a learning model, and estimate a dose distribution in a magnetic field, the learning model including a plurality of layers and being trained to output a normalized dose distribution in a magnetic field when a normalized dose distribution not in a magnetic field and information based on a captured image are input.

7. A dose distribution creating apparatus, comprising:
   an acquisition unit configured to acquire a captured image of a subject captured with a magnetic field and an electrical wave or a photon beam and a dose distribution not in a magnetic field calculated based on the captured image and normalized; and
   a magnetic field correction unit configured to input the acquired dose distribution not in a magnetic field and information based on the acquired captured image to a learning model, and to estimate a dose distribution in a magnetic field, the learning model including a plurality of layers and being trained to output a normalized dose distribution in a magnetic field when a normalized dose distribution not in a magnetic field and information based on a captured image are input.

* * * * *